United States Patent [19]

Zeisky

[11] 4,072,407

[45] Feb. 7, 1978

[54] APPARATUS FOR HOLDING, READING AND HANDLING BOOKS

[76] Inventor: Andre Zeisky, 21 Sturgis Road, Kendall Park, N.J. 08824

[21] Appl. No.: 697,828

[22] Filed: June 21, 1976

[51] Int. Cl.[2] ...................... G02B 27/02; B42D 17/00; B42D 9/00

[52] U.S. Cl. .................................... 350/241; 116/119; 281/42; 350/243

[58] Field of Search ................................ 350/239-241, 350/243; 281/42, 47, 49; 116/119; 248/441 A, 446-453

[56] References Cited

U.S. PATENT DOCUMENTS

| | | | |
|---|---|---|---|
| 89,307 | 4/1864 | Gridley | 248/452 |
| 327,682 | 10/1885 | Hockett | 116/119 |
| 569,478 | 10/1896 | Wintermute, Jr. | 116/119 |
| 841,237 | 1/1907 | Dudley | 248/42 |
| 975,924 | 11/1910 | Aray | 116/119 |
| 1,405,818 | 2/1922 | Dickerson | 281/47 |
| 2,957,390 | 10/1960 | Baukus | 350/241 |

*Primary Examiner*—Paul A. Sacher
*Assistant Examiner*—Wm. H. Punter

[57] ABSTRACT

A body having an elongated member adapted to fit along the center line of an open book, provided with means fixed at one end for removably fastening the body to the spine of said book. Auxiliary members received by the body for movement along its length in association with the printed matter in said book.

15 Claims, 19 Drawing Figures

APPARATUS FOR HOLDING, READING AND HANDLING BOOKS

BACKGROUND OF THE INVENTION

The present invention relates to an aide for holding, reading, and marking books and in particular to a device facilitating the handling of books in difficult situations.

Frequently readers, particularly students, are required to read and study certain passages of books, notably textbooks for long periods of time. Often, because of the need to work elsewhere, do supplemental reading or because of normal interruptions the reader must frequently mark the book to indicate important passages, maintain his place at a certain page and even underline certain passages. Further, many readers pursue their activity on trains, buses and the like, where the marking and maintenance of the proper place are most difficult. These difficulties are compounded when the book is a soft cover or paper back, since such books have weak spines, small pages, and extremely small print.

It is an object of the present invention to provide a device which will mitigate against the aforementioned disadvantages and provide simple, easily useable means for maintaining page and line position, enable marking, with pen, pencil or the like selected lines and passages and which will enable the reader to more easily manipulate the book.

The foregoing objects, as well as other objects and advantages will be apparent from the following disclosure of the present invention.

SUMMARY OF THE INVENTION

According to the present invention apparatus is provided aiding in the handling of a book comprising a body having an elongated member adapted to fit along the center line of the book when opened. The body has means fixed at one end for removably fastening it to the spine of the book. Auxiliary members are provided which are movably received by the body and slidable along its length in association with the printed page of the book.

The auxiliary members can be line guides, transparent and/or magnifying plates, pencil guides for underlining etc. All the auxiliary devices are characterized by their being easily exchangeable on the body, movable therewith and do not interfere with the reading.

Preferably, the body is formed of a continuous rod bent or twisted into shape with a pair of parallel elongated members which provide strength and resiliency, and upon which the auxiliary members may be secured.

Full details of the present invention follow herein and are shown in the accompanying drawings.

DESCRIPTION OF THE INVENTION

Figure 4:
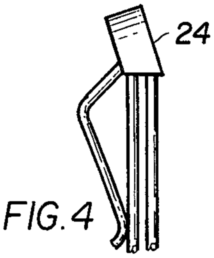
FIG. 4 is a detail of the head end of the device of FIG. 1.
Figure 3:
FIG. 3 is a top planar view of the device of FIG. 1.
Figure 2:
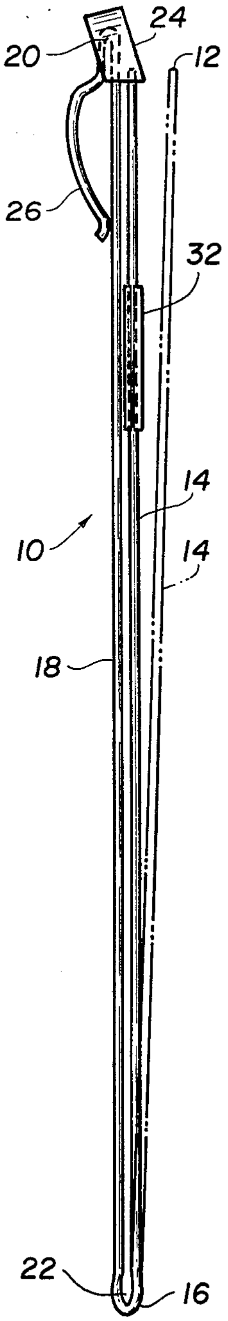
FIG. 2 is a side elevational view of the device of FIG. 1.
Figure 1:
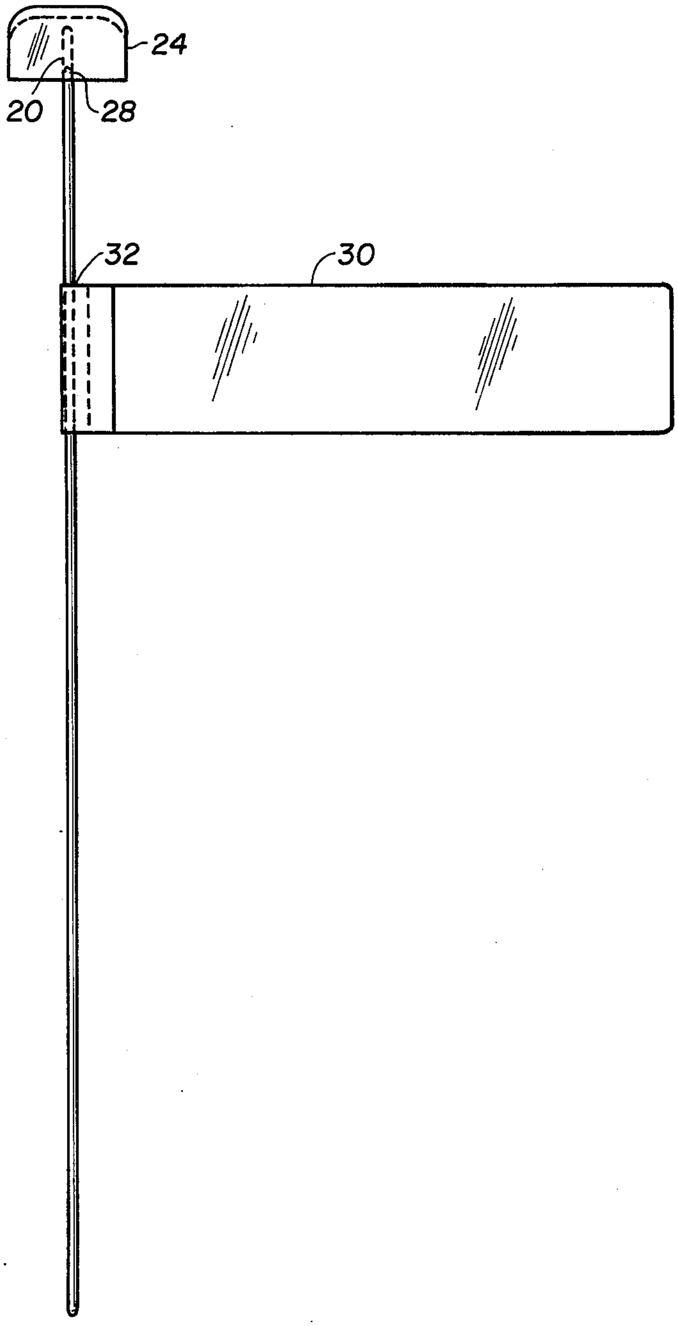
FIG. 1 is a front elevational view of one embodiment of the device of the present invention, including one form of auxiliary device.

Turning to FIGS. 1 and 2, the present invention is embodied in a device comprising a body, generally depicted by the numeral 10, formed of a single unitary rod bent to straddle the spine, or backbone of a book, when the book is open. Preferably the body 10 is formed of metal wire, elongated spring resiliently plastic wire, strip stock or the like. The body extends from a free end 12, along an elongated front leg 14, of a length, of about 8 – 10 inches for example, sufficient to extend the height of a book, into a reverse or approximately 360° U-shaped bend 16 at its lower end, into an elongated back member 18 culminating in a bent head 20 at its upper end. The lower bend 16, is formed somewhat bulbously, as at 22, so as to provide the front and back members 14 and 18, which are straight, parallel and in a common plane with a degree of flexibility, resiliency and spring action between them, as indicated by the dotted lines, much in the nature of a tuning fork. The upper head 20 is encased in a molded solid finger grip 24 capable of being grasped by the hand and sufficiently large to enable transport of both the device and the book which it straddles. Preferably the grip 24 is plastic and is molded in situ about the head 20 so that it forms an integral part with the head. The head 20 is further provided with an elongated curved member 26, which extends coplanarily with the front and back members 14 and 18 in the nature of a spring clip. This spring clip portion 26 is of sufficient length to enable it to be placed or "clipped" over the back of the book spine along its center when the book is opened to thereby hook or clip the device to the book, while the back rod 18 lies against the inner book spine. The grip 24 is provided with a small hole 28, into which the end 12 of the front rod 14 is adapted to removably fit by being slightly bent, thereby maintaining the front and back rods in parallel relatively fixed position.

In use the device is thus clipped on to the book with the clip portion 26 behind the book, the elongated back rod 18 resting within the book against its center line and the front rod spaced therefrom closer to the plane of the page. As such the device is a "page marker", as it separates two adjacent pages.

Figure 13:
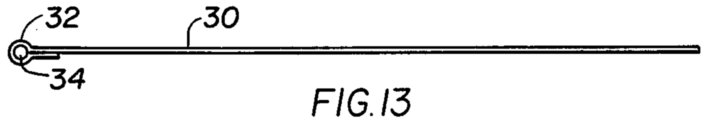
FIG. 13 is a side edge view showing the formation of the auxiliary device of FIGS. 2 and 11.

To provide other desirable functions, various auxiliary devices may be provided, for example, as a line indicator, the device is provided with a flat, rectangular, transparent plastic guide 30, of a thickness of about 1 – 2 mm and of a length generally sufficient to traverse the length of the printed line. The guide 30 is provided with a beaded end 32 through which a through hole 34 is formed, as seen in FIG. 13, capable of fitting sleeve like over the front member 14 of the body 10 when the end 12 is spring free of the hole 28. Since the end 12 of body 10 is freely removable, the guide 30 may be easily removed, and replaced if desired, with auxiliary devices of a different form. Preferably, the beaded end 32 of the guide is of such an inside cross section that it fits snugly over the front rod of the body, which as will be recalled, is under a certain spring bias, so that the guide itself is held in fixed position along any portion of the length of the front rod under a degree of tension. In this manner only a predetermined shove or push on the guide by the user will move it. Consequently, unless so moved the guide will maintain a given line orientation on the page of the book.

Figure 14:
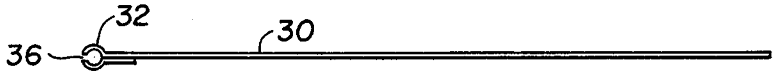
FIG. 14 is a similar view of a modified auxiliary device of FIGS. 2 and 11.

In FIG. 14, a similar construction is shown except that the hub 32 is not closed as a sleeve but left with an axial slot 36. This provides a snap-on type sleeve-like arrangement which might be more easily placed on or removed from the rod members 14 and 18. This clip like snap-on construction permits easy assembly and removal of this auxiliary device on the front rod. It will also be appreciated that such a snap-on construction may be used alternatively with the closed sleeve 32 on the guide 30 or similar device.

Figure 6:
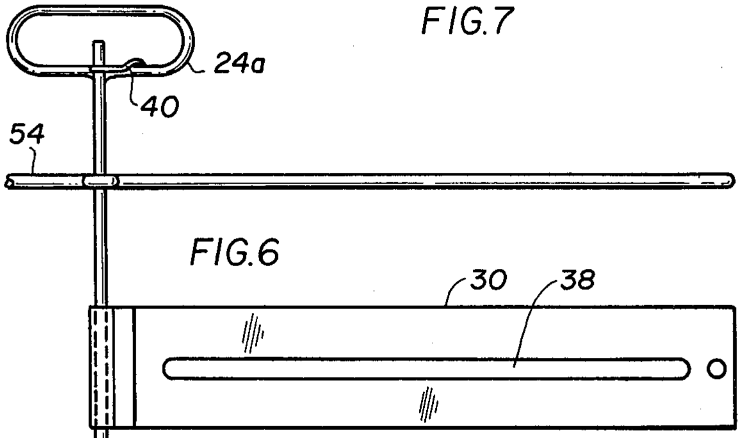
FIG. 6 is a view of the device of FIG. 5 taken similarly to FIG. 2 and illustrating another auxiliary device.
Figure 11:
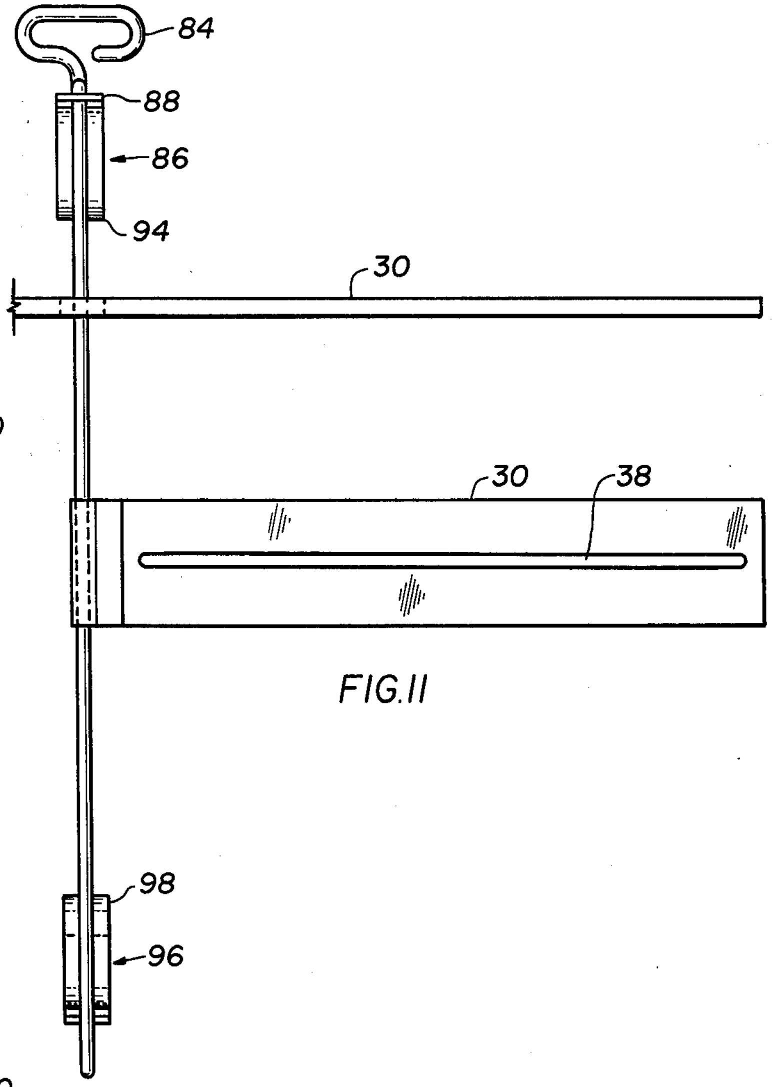
FIG. 11 is a front elevational view of the device of FIG. 10.
Figure 12A:
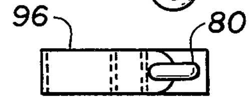
FIG. 12*a* is a bottom plan view.

As seen in FIGS. 6 and 11, the guide 30 may be provided with an elongated horizontal slot 38 through which a pen or pencil may be inserted. In this manner, a given line may be underscored. This is of particular advantage to those users riding trains, buses or cars, since a smooth straight line can be made even under the most trying conditions. Because the guide does not readily move or vibrate the pencil will be positively guided in the straight path even though the user's hand may shake or vibrate. The guide may be provided as desired with indicia designating the right or left side pages or holes such as R (FIG. 6), to permit marginal markings.

Figure 7:
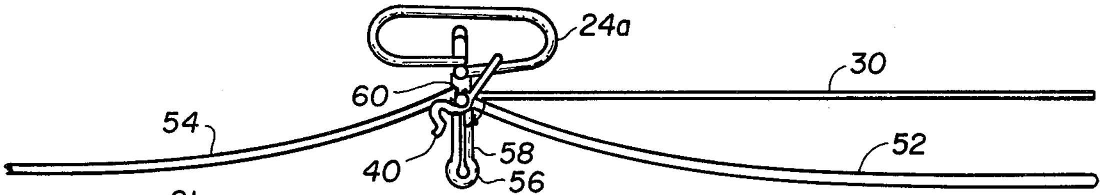
FIG. 7 is a plan view of still another auxiliary device for holding open opposite pages.
Figure 5:
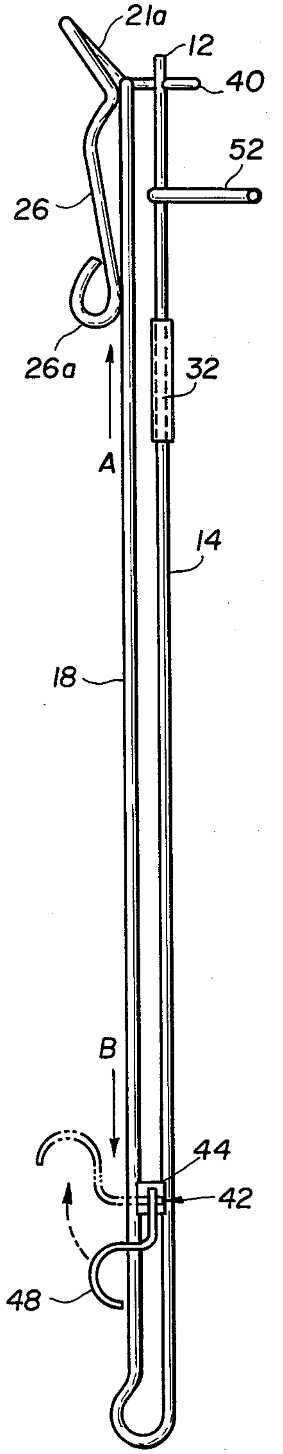
FIG. 5 is a view of another embodiment of the invention, taken similarly to FIG. 1.

In the embodiment seen in FIGS. 5 – 7 where similar elements bear the same reference numerals, the head 20 may be so twisted and made into an oval shape to form a self grip 24*a*, thereby eliminating the need for an additional plastic member. On the other hand, the shaped grip 24*a* may enable an advertising or other visual card or indicator to be held therein which may be replaced as desired. The end of the spring 26 can be rounded to suitable shape as at 26*a*.

To insure that the guide is properly restrained and the front and back rods 14 and 18 are kept under sufficient spring bias in the absence of a large grip such as shown in FIG. 1, there is illustrated in FIGS. 5 – 7 a hook 40, arranged at the base of the head 20 into which the free end 12 of the front member 14 is adapted to snap. The hook 40 may be a simple wire like latch, freely secured by twisting it about the wire at the head 20, and/or it may be a more elaborately fashioned member, welded or molded to the wire.

To enable adjustment of the device of any embodiment to be variously sized to conform to several books of different height, a length limiting device, generally depicted by the numeral 42 is movably secured at the lower end of the body 10. As seen in FIGS. 5 and 6, such a length limiting device comprises a rectangular solid hub 44 having concave edges 46 about its entire periphery and a short lever arm 48 fixed along the central axis of the hub. The concave edges 46 conform substantially to the circumference or shape of the front and rear rods 14 and 18 and the rectangle is of such a size so that in its narrower dimension it fits within the bight between the members 14 and 18, under spring tension, but movable along the entire length, and in its wider dimension under such excessive tension with the front and rear members 14 and 18 that it binds and is no longer movable therealong. Basically, the limiting member 42 thus provides an over the center snap lock which is adjustable along the length of the body 10. Thus after the device is clipped on the book, by the spring clip 26, (the book fitting between the clip 26 and the back rod 18, as indicated by the arrow A), the limiting device 42 is moved upwardly to engage the lower edge of the book, thereby "squeezing" the book between its upper edge and its lower edge, as indicated by the arrow B. Once this position is obtained the limiting device 42 is locked in place. As a result, the device is held securely and permanently in place on any size book, and the device together with the book may be transported by handling the grip 24. It may even be hung in this condition.

To further insure the position of the limiting device 42 on the book, the lever arm may be curved or hooked so that when locked in place, it extends behind the binding of the spine, and itself acts as a spring clip. It will thus be observed that a relatively few different sized bodies will be required to handle the wide range of book sizes. In fact a single size body, with the limiting device will be useful in the most generally sized books, of either hard or soft cover. Paper back books being generally smaller will probably require a size of its own.

Various modifications may be made to the basic device. For example, in FIG. 7 means for maintaining both leaves of the book in open position is provided, comprising a wing like (butterfly) wire member 50, of wide arc, having oppositely directed arms 52 and 54 adapted to traverse each page of an open book. The member 50 is provided with a central bend portion 56 extending in straight vertical arms 58 forming a circular sleeve 60 such as that shown in FIG. 13, which may if desired be slipped over the front rod 14 in sleeve like manner or with a pair of arcuate sections which are under attractive tension to provide a clip like fastener such as shown in FIG. 14, which may be snapped readily over the rod forming the front member 14.

Figure 8:
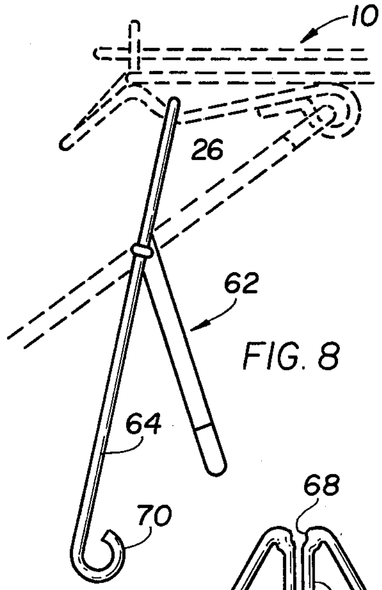
FIG. 8 is a side view of a supporting tripod used with the device of the present invention.
Figure 9:
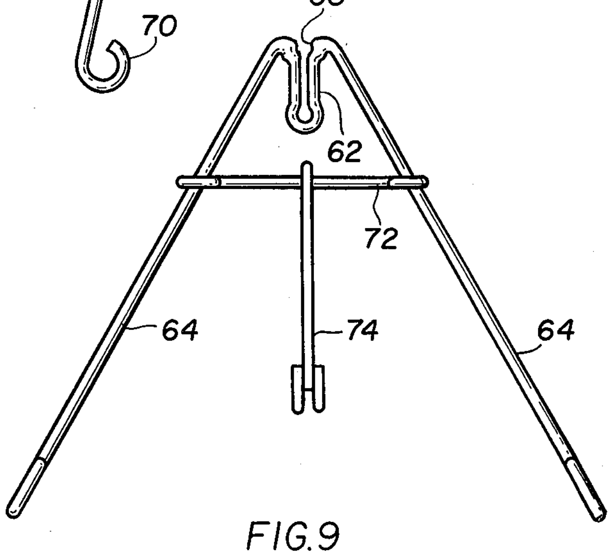
FIG. 9 is a front view of the tripod.

Still another auxiliary device is shown in FIGS. 8 and 9. Here, a book stand or propping device, generally depicted by the numeral 62 is shown, comprising a tripod arrangement formed of a pair of angular spread legs 64, integrally formed with a central member 66, formed with a resilient snap-on construction such as that of FIG. 7, comprising vertical arms and a circular sleeve like, open end 68. The ends 70 of the legs are turned upward to provide a smooth stand, and the legs are joined by a traversing arm 72, which prevents the legs from spreading beyond their given shape when loaded with a book. A third leg 74 is pivotally secured at the center of the traversing arm, and is pivotal to provide an adjustable position with respect to the legs 72. The tripod 62 is adapted to snap onto the spring clip 26 member of the body 10, and be movable with respect to it so as to form an adjustable rest, allowing the body 10 and the book it holds to assume a variety of selected inclined positions.

Figure 12:
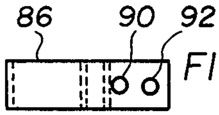
FIG. 12 is a top planar view of the device of FIG. 10.
Figure 10:
FIG. 10 is a side elevational view of a third embodiment of the present invention.

As seen in FIGS. 10 - 12, a modified device comprises a body made from drawn wire having a front elongated rod 80 and a rear rod 82 parallel and coplanar with it. Unlike the principle embodiment, the end of the rear member 82 is twisted to form a finger grip 84 extending transversly to the plane of the members and with a continuing bend into a spring clip member. The spring clip member, generally depicted by numeral 86 is formed separately comprising a flat strip of metal having a horizontal part 88 slipped over the rear member and fastened thereto at 90 by swagging, brazing, welding or the like. The part 88 extends toward the first parallel rod and is provided with a hole 92 into which the front member can be snapped. To the rear the flat strip is bent and folded into a spring clip shape 94 coacting with the rear rod to allow grasping of the spine of the book, as in FIG. 1. The hole 92 may be replaced with a transverse hook slot.

The lower limiting member, generally depicted by numeral 96 is similarly fashioned of flat metal strip and bent and curved into a spring clip portion 98. It however, is provided with a hole which slidably but snugly fits over the rear rod 82, so that it is movable along its length, but which will incline and twist, bending with the slide member when spread over the spine of the book. Thus, the bottom limiting member is adjustably positionable and once so positioned with a book will be fixedly retained. This embodiment accepts auxiliary members in any one of the modes previously described.

Figure 15:
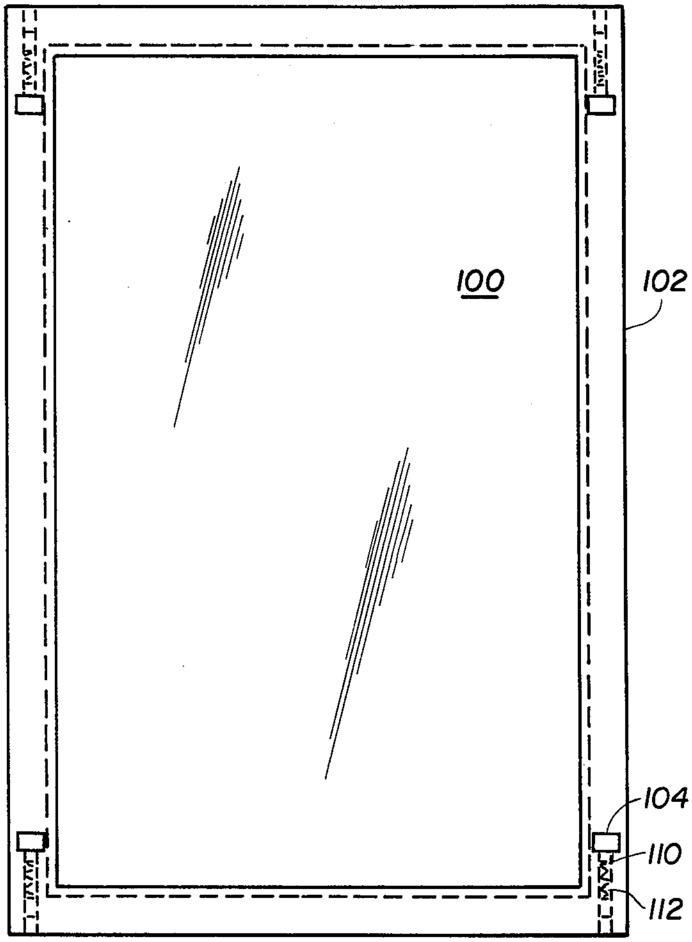
FIG. 15 is a planar view of an auxiliary device embodying a magnifying glass.
Figure 16:
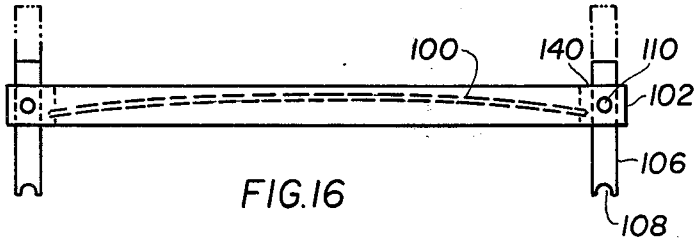
FIG. 16 is a sectional view along lines 16 — 16 of FIG. 15.

In FIGS. 15 and 16, a further auxiliary device is depicted comprising a sheet of magnifying material 100 is set within a rectangular frame 102, at the corners of which are provided holes 104 into each of which legs 106 are set. The legs 106 are provided with a partially circular snap in sleeve 108. The legs 106 are removably and resiliently loaded in holes 104 by the use of a small pin 110 and spring 112 so that they may be positioned with the snap in sleeve 108 in either direction, thereby the two legs along any side edge can be used cooperatively for placement on the front rod 14 to overlay the page, either in long or short dimension.

Figure 17:
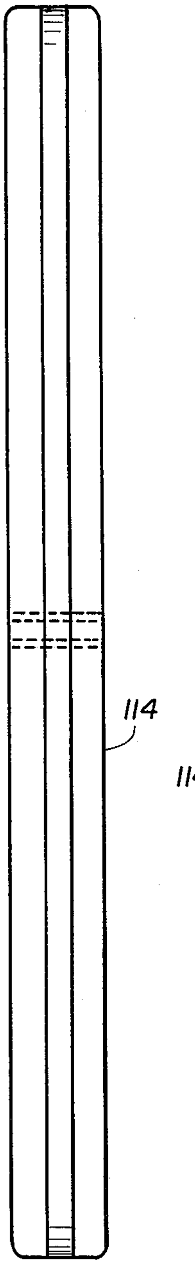
FIG. 17 is a planar view of still another embodiment employing a magnifying strip for enlarging a line.
Figure 18:
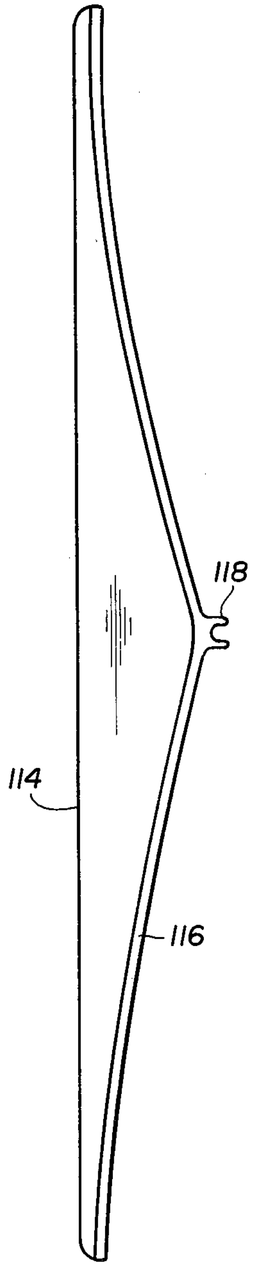
FIG. 18 is an end view of the device of FIG. 17.

In FIGS. 17 and 18, a line magnifying auxiliary device is provided, comprises a flat strip of prismatic enlarging material 114 supported on a butterfly arrangement such as shown in FIG. 7, comprising a pair of arms 116 and a central snap on sleeve 118. This embodiment includes the advantages of both the butterfly page opener of FIG. 7 and the magnifying glass of FIG. 15.

It will be observed that the body is depicted as being formed of round wire or rod like material, it will however, be appreciated that the rod may be rectangular or even triangular. The attachment means on the auxiliary members, as well as the bore in the sleeves, each adapted to fit over the wire may of course, be correspondingly shaped. The rod however, should be relatively thin or of narrow cross section, so as not to interfere with the proper closing of the book.

Various modifications, changes and embodiments have been described, others will be obvious to those skilled in the art. Therefore, this disclosure is to be taken as illustrative and not as limiting of the scope thereof.

What is claimed:

1. Apparatus for aiding in the handling of books comprising a body having an elongated member adapted to fit along the center line of an open book, said body having means fixed at one end resiliently biased with respect to said body for removably fastening said body to the spine of said book, said body being formed of an elongated continuous wire provided with a reverse bend forming a pair of parallel coplanar elongated slide members between its ends, said slide members being spring loaded with respect to each other, and an auxiliary member slidably secured to one of said parallel members for manual movement along its length in association with the printed matter in said book and held at least in part against movement therealong by the bias of said parallel slide members.

2. The apparatus according to claim 1 wherein said body includes means at its upper end for manual grasping.

3. The apparatus according to claim 1 including a fastening means, adjustable along the length of said body for removably securing said body to the spine of said book at the end opposite said fixed fastening means.

4. The apparatus according to claim 1 including tripod means engageable with said body for supporting said book on a horizontal surface.

5. The apparatus according to claim 1 wherein one of the parallel slide members of said elongated continuous wire is bent at one end to form integrally therewith said fixed fastening means.

6. The apparatus according to claim 1 wherein said auxiliary member comprises a member having a pair of extending arms and a central hub, said central hub being adapted to be secured to said body and said arms being adapted to extend over facing pages of said book.

7. The apparatus according to claim 6 wherein at least one of said arms is transparent.

8. The apparatus according to claim 1 wherein one of said parallel slide members terminates in a free end, and said auxiliary member is provided with means having a hole adapted to slidably fit over said one parallel slide member to be secured thereon.

9. The apparatus according to claim 8 including means for detachably securing the free end of said one parallel slide member to the other one of said parallel slide members.

10. The apparatus according to claim 1 including a latch member adapted to fit over the end of the book on which said body is placed, said latch being movably secured on at least one of said parallel slide members and having means for fixing the latch in a selected position spaced from the bent end of said body to engage said book.

11. The apparatus according to claim 10 wherein said latch comprises a rectangular hub secured between said parallel slide members, and rotatable about an axis perpendicular thereto, said hub being movable when rotated in one direction and fixed when rotated in another, and includes a lever secured to said hub to selectively rotate said hub said lever being adaptable to extend behind the spine of said book when said hub is rotated into said other direction.

12. The apparatus according to claim 1 wherein the auxiliary member comprises a plate, securable to said body and extending transversely across at least one of the pages of said open book.

13. The apparatus according to claim 12 wherein said plate is transparent.

14. The apparatus according to claim 13, said transparent plate having a narrow slot formed therein adapted to the receipt of a writing instrument.

15. The apparatus according to claim 13 wherein said transparent plate is made of magnifying material.

* * * * *